United States Patent
Kim et al.

(10) Patent No.: US 10,366,839 B1
(45) Date of Patent: Jul. 30, 2019

(54) ELECTRONIC COMPONENT

(71) Applicant: SAMSUNG ELECTRO-MECHANICS CO., LTD., Suwon-Si, Gyeonggi-Do (KR)

(72) Inventors: Ho Yoon Kim, Suwon-Si (KR); Sang Soo Park, Suwon-Si (KR); Woo Chul Shin, Suwon-Si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 16/200,639

(22) Filed: Nov. 26, 2018

(30) Foreign Application Priority Data

Oct. 5, 2018 (KR) .................. 10-2018-0118953

(51) Int. Cl.
*H01G 4/30* (2006.01)
*H01G 2/06* (2006.01)
*H01G 4/248* (2006.01)
*H01G 4/12* (2006.01)

(52) U.S. Cl.
CPC ............... *H01G 4/30* (2013.01); *H01G 2/06* (2013.01); *H01G 4/248* (2013.01); *H01G 4/12* (2013.01)

(58) Field of Classification Search
CPC ............ H01G 2/06; H01G 4/30; H01G 4/248
See application file for complete search history.

(56) References Cited

U.S. PATENT DOCUMENTS

| | | | |
|---|---|---|---|
| 2004/0130877 A1 | 7/2004 | Okubora | |
| 2013/0037911 A1 | 2/2013 | Hattori et al. | |
| 2014/0016242 A1 | 1/2014 | Hattori et al. | |
| 2015/0270068 A1* | 9/2015 | Hattori | H01G 4/30 361/301.4 |
| 2017/0076863 A1* | 3/2017 | Park | H01G 4/30 |

FOREIGN PATENT DOCUMENTS

| | | |
|---|---|---|
| JP | 5472230 B2 | 4/2014 |
| KR | 10-2004-0076577 A | 9/2004 |
| KR | 101529900 B1 | 6/2015 |

* cited by examiner

*Primary Examiner* — Eric W Thomas
(74) *Attorney, Agent, or Firm* — Morgan, Lewis & Bockius LLP

(57) ABSTRACT

An electronic component includes: a multilayer ceramic capacitor including a capacitor body and external electrodes disposed on opposite ends of the capacitor body in a first direction, respectively; and an interposer including an interposer body including a woven glass fiber material and external terminals disposed on opposite ends of the interposer body in the first direction, respectively. An angle between a weaving direction of the woven glass fiber material and the first direction is 0° to 10° or 80° to 90°.

9 Claims, 5 Drawing Sheets

ELECTRONIC COMPONENT

CROSS-REFERENCE TO RELATED APPLICATION(S)

This application claims benefit of priority to Korean Patent Application No. 10-2018-0118953 filed on Oct. 5, 2018 in the Korean Intellectual Property Office, the disclosure of which is incorporated herein by reference in its entirety.

TECHNICAL FIELD

The present disclosure relates to an electronic component.

BACKGROUND

A multilayer ceramic capacitor (MLCC) has been used in various electronic devices since it has a small size, implements a high capacitance, and may be easily mounted.

The multilayer ceramic capacitor has a structure in which internal electrodes having different polarities are alternately stacked between a plurality of dielectric layers.

A material of the dielectric layer may be a ferroelectric material. Since the ferroelectric material has piezoelectric characteristics, when a direct current (DC) or alternating current (AC) voltage is applied to the multilayer ceramic capacitor, a piezoelectric phenomenon may occur between the internal electrodes to generate periodical vibrations while expanding and contracting a capacitor body depending on a frequency.

These vibrations may be transferred to a board through external electrodes of the multilayer ceramic capacitor and solders connecting the external electrodes and the board to each other, such that the entirety of the board may act as a sound reflecting surface to generate a vibration sound, known as a noise.

The vibration sound may correspond to an audio frequency causing listener discomfort. The vibration sound causing listener discomfort, as described above, is known as acoustic noise.

In a method of reducing such vibrations, there is an electronic component in which an interposer is disposed between the multilayer ceramic capacitor and the board.

However, in accordance with the trend toward for performance improvements and miniaturization of electronic devices, the necessity for an electronic component having a small size has increased. Therefore, demand for technology capable of effectively reducing vibration sound in a multilayer ceramic capacitor having a small size of 0804 (0.8 mm×0.4 mm) or less has increased.

SUMMARY

An aspect of the present disclosure may provide an electronic component in which an acoustic noise reducing effect of a predetermined level or more may be expected, even in a multilayer ceramic capacitor having a small size.

According to an aspect of the present disclosure, an electronic component may include: a multilayer ceramic capacitor including a capacitor body and external electrodes disposed on opposite ends of the capacitor body in a first direction, respectively; and an interposer including an interposer body including a woven glass fiber material and external terminals disposed on opposite ends of the interposer body in the first direction, respectively, wherein an angle between weaving direction of the woven glass fiber material and the first direction is 0° to 10° or 80° to 90°.

The interposer body may have grooves formed in opposite end surfaces thereof in the first direction, respectively, and each of the external terminals may include a bonded portion formed on an upper surface of the interposer body and connected to a respective one of the external electrodes, a mounting portion formed on a lower surface of the interposer body, and a connecting portion formed on the groove of the interposer body to connect the bonded portion and the mounting portion to each other.

The multilayer ceramic capacitor may have a length of 0.8 mm or less and a width of 0.4 mm or less.

The multilayer ceramic capacitor may have a thickness of 0.7 mm or less.

The multilayer ceramic capacitor may further include conductive adhesive portions disposed between the external electrodes and the external terminals.

The electronic component may further include plating layers disposed on surfaces of the external electrodes and the external terminals, respectively.

The capacitor body may have first and second surfaces opposing each other, third and fourth surfaces connected to the first and second surfaces and opposing each other in the first direction, and fifth and sixth surfaces connected to the first and second surfaces, connected to the third and fourth surfaces, and opposing each other, and include a plurality of dielectric layers and first and second internal electrodes alternately arranged having the dielectric layers interposed therebetween, the external electrodes may include first and second external electrodes disposed on the third and fourth surfaces of the body, respectively, and the first internal electrodes may be exposed through the third surface to be connected to the first external electrode and the second internal electrodes may be exposed through the fourth surface to be connected to the second external electrode.

L may be 0.8 mm or less, W may be 0.4 mm or less, and T may be 0.7 mm or less, in which T is a distance between the first surface and the second surface of the capacitor body, L is a distance between the third surface and the fourth surface of the capacitor body, and W is a distance between the fifth surface and the sixth surface of the capacitor body.

The first and second internal electrodes may be alternately arranged in a direction in which the first and second surfaces are connected to each other with each of the dielectric layers interposed therebetween.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
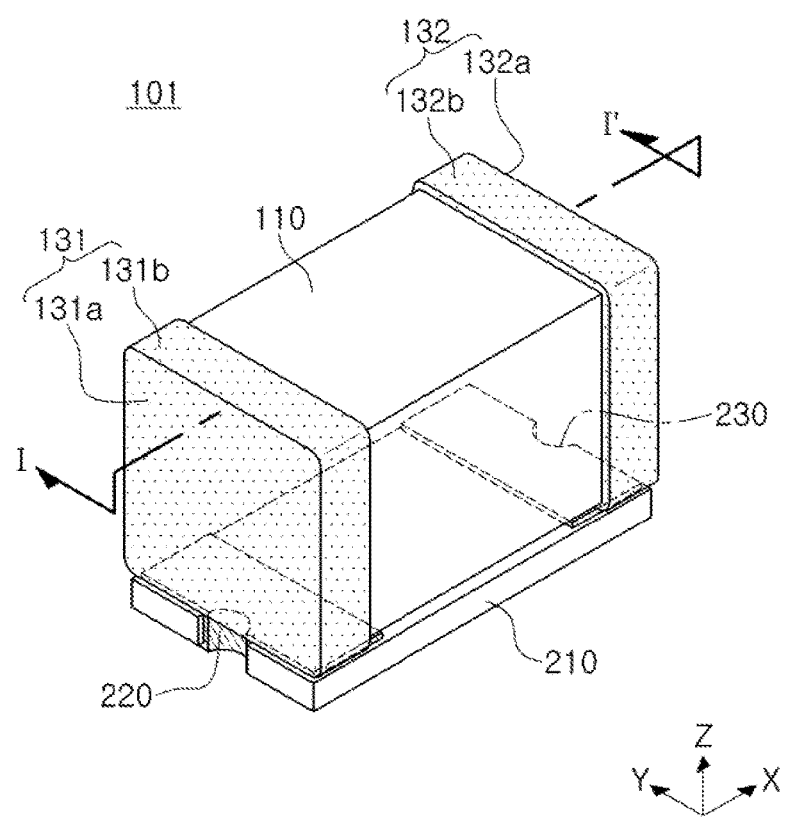
FIG. 1 is a schematic perspective view illustrating an electronic component according to an exemplary embodiment in the present disclosure.

Hereinafter, exemplary embodiments of the present disclosure will now be described in detail with reference to the accompanying drawings.

Directions will be defined in order to clearly describe exemplary embodiments in the present disclosure. X, Y and Z in the drawings refer to a length direction, a width direction, and a thickness direction of a multilayer ceramic capacitor and an interposer, respectively.

Here, the X direction refers to a first direction.

Electronic Component

FIG. 1 is a schematic perspective view illustrating an electronic component according to an exemplary embodiment in the present disclosure.

Figure 2:
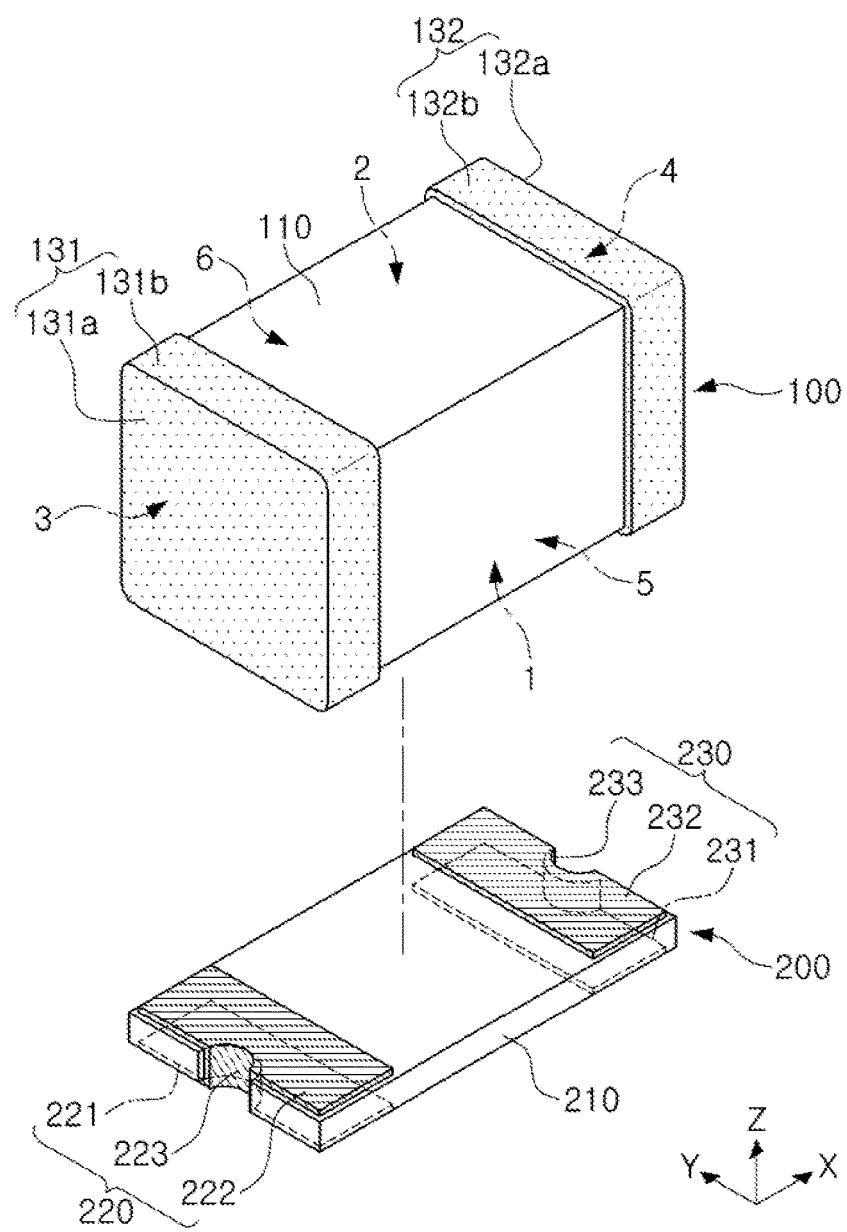
FIG. 2 is an exploded perspective view of FIG. 1.

FIG. 2 is an exploded perspective view of FIG. 1.

Figure 3A:
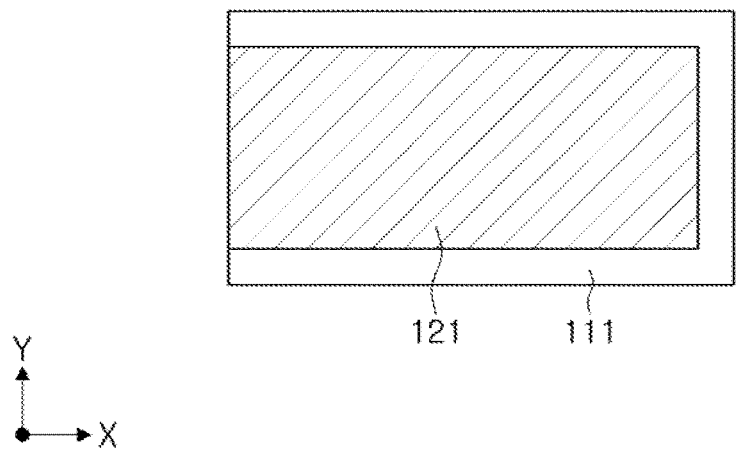
FIGS. 3A and 3B are plan views illustrating, respectively, first and second internal electrodes of a multilayer ceramic capacitor of FIG. 1.
Figure 3B:
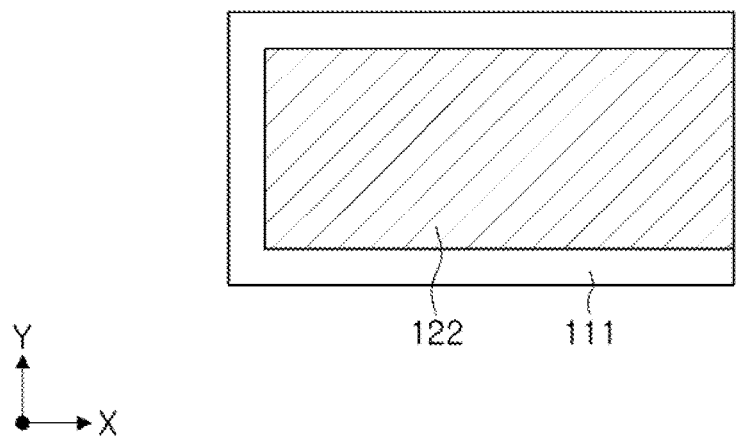

FIGS. 3A and 3B are plan views illustrating, respectively, first and second internal electrodes of a multilayer ceramic capacitor of FIG. 1.

Figure 4:
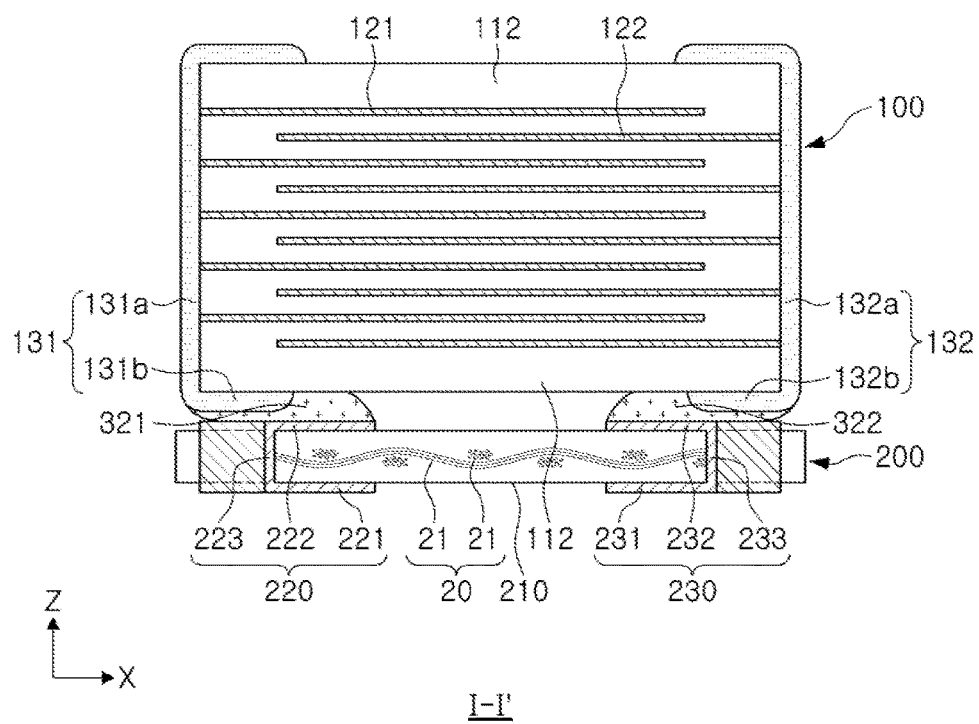
FIG. 4 is a schematic cross-sectional view taken along line I-I' of FIG. 1.

FIG. 4 is a schematic cross-sectional view taken along line I-I' of FIG. 1.

Figure 5:
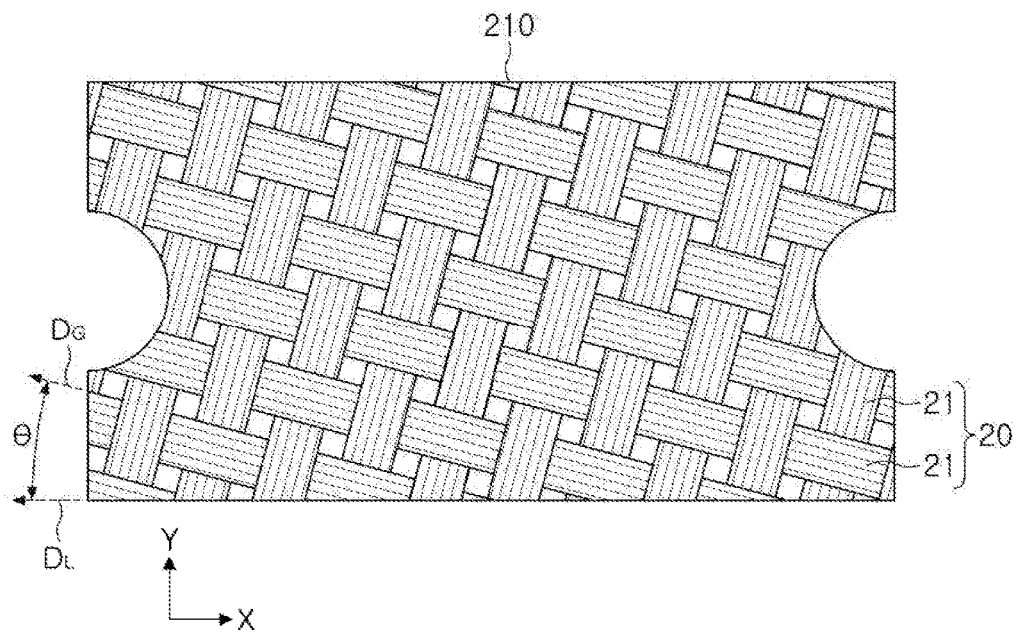
FIG. 5 is a view of a woven glass fiber material of an interposer body.

FIG. 5 is a view of a woven glass fiber material of an interposer body.

Referring to FIGS. 1 through 5, an electronic component 101 according to an exemplary embodiment in the present disclosure may include a multilayer ceramic capacitor 100 including a capacitor body 110 and a pair of external electrodes 131 and 132 formed on opposite ends of the capacitor body in a first direction (an X direction), respectively; and an interposer 200 including an interposer body 210 including a woven glass fiber material 20 formed by weaving glass fibers and a pair of external terminals 220 and 230 formed on opposite ends of the interposer body 210 in the first direction (the X direction), respectively. An angle formed by a weaving direction of the woven glass fiber material 20 and the first direction is 0° to 10° or 80° to 90°. The weaving direction may refers to a direction along which a woven glass fiber extends. The woven glass fibers may include first woven glass fibers extending in one direction and second woven glass fibers woven with the first woven glass fibers and extending in another direction crossing the first direction. The directions, along which the first woven glass fibers and the second woven glass fibers extend, respectively, may be perpendicular to each other.

The multilayer ceramic capacitor 100 according to the present exemplary embodiment may include the capacitor body 110 and first and second external electrodes 131 and 132 on the opposite ends of the capacitor body 110 in the first direction, respectively.

In this case, a length of the multilayer ceramic capacitor 100 may be 0.8 mm or less, and a width of the multilayer ceramic capacitor 100 may be 0.4 mm or less.

In addition, a thickness of the multilayer ceramic capacitor 100 may be 0.7 mm or less.

The capacitor body 110 may be formed by stacking and then sintering a plurality of dielectric layers 111 in the Z direction, and adjacent dielectric layers 111 of the capacitor body 110 may be integrated with each other so that boundaries therebetween are not readily apparent without using a scanning electron microscope (SEM).

In addition, the capacitor body 110 may include the plurality of dielectric layers 111 and first and second internal electrodes 121 and 122 alternately arranged in the Y direction with each of the dielectric layers 111 interposed therebetween and having different polarities.

In addition, the capacitor body 110 may include an active region contributing to forming a capacitance of the multilayer ceramic capacitor, and cover regions 112 provided as margin portions at opposite side portions of the capacitor body 110 in the Y direction and on upper and lower surfaces of the active region in the Z direction, respectively.

A shape of the capacitor body 110 is not particularly limited, but may be a hexahedral shape, and the capacitor body 110 may have first and second surfaces 1 and 2 opposing each other in the Z direction, third and fourth surfaces 3 and 4 connected to the first and second surfaces 1 and 2 and opposing each other in the X direction (the first direction), and fifth and sixth surfaces 5 and 6 connected to the first and second surfaces 1 and 2, connected to the third and fourth surfaces 3 and 4, and opposing each other.

When a distance between the first surface 1 and the second surface 2 of the capacitor body 110 is T, a distance between the third surface 3 and the fourth surface 4 of the capacitor body 110 is L, and a distance between the fifth surface 5 and the sixth surface 6 of the capacitor body 110 is W, L may be 0.8 mm or less, W may be 0.4 mm or less, and T may be 0.7 mm or less.

The dielectric layer 111 may include ceramic powders such as $BaTiO_3$-based ceramic powders, or the like.

An example of the $BaTiO_3$-based ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which Ca, Zr, or the like, is partially solid-dissolved in $BaTiO_3$. However, the $BaTiO_3$-based ceramic powder is not limited thereto.

In addition, the dielectric layer 111 may further include a ceramic additive, an organic solvent, a plasticizer, a binder, a dispersant, and the like, in addition to the ceramic powders.

The ceramic additive may include, for example, a transition metal oxide or a transition metal carbide, a rare earth element, magnesium (Mg), aluminum (Al), or the like.

The first and second internal electrodes 121 and 122, which are electrodes having different polarities, may be formed on the dielectric layers 111 and be stacked in the Z direction, and may be alternately arranged in the capacitor body 110 to face each other in the Z direction with each of the dielectric layers 111 interposed therebetween.

In this case, the first and second internal electrodes 121 and 122 may be electrically insulated from each other by each of the dielectric layers 111 disposed therebetween.

Meanwhile, a structure in which the internal electrodes are stacked in the Z direction is illustrated and described in the present disclosure. However, the present disclosure is not limited thereto, and may also be applied to a structure in which the internal electrodes are stacked in the Y direction, if necessary.

One ends of the first and second internal electrodes 121 and 122 may be exposed through the third and fourth surfaces 3 and 4 of the capacitor body 110, respectively.

The end portions of the first and second internal electrodes 121 and 122 alternately exposed through the third and fourth surfaces 3 and 4 of the capacitor body 110, respectively, may be electrically connected to first and second external electrodes 131 and 132 to be described below disposed on the opposite end portions of the capacitor body 110 in the X direction (the first direction), respectively.

According to the configuration as described above, when predetermined voltages are applied to the first and second external electrodes 131 and 132, electric charges may be accumulated between the first and second internal electrodes 121 and 122.

In this case, a capacitance of the multilayer ceramic capacitor 100 may be in proportion to an area of the first and second internal electrodes 121 and 122 overlapping each other in the Z direction in the active region.

In addition, a material of each of the first and second internal electrodes 121 and 122 is not particularly limited, and may be a conductive paste, or the like, formed of one or more of, for example, a noble metal material such as a platinum (Pt), palladium (Pd), a palladium-silver (Pd—Ag) alloy, or the like, nickel (Ni), and copper (Cu).

In this case, a method of printing the conductive paste may be a screen printing method, a gravure printing method, or the like, but is not limited thereto.

Voltages having different polarities may be provided to the first and second external electrodes 131 and 132, respectively, and the first and second external electrodes 131 and 132 may be disposed on the opposite end portions of the capacitor body 110 in the X direction, respectively, and may be electrically connected to the exposed end portions of the first and second internal electrodes 121 and 122, respectively.

The first external electrode 131 may include a first head portion 131a and a first band portion 131b.

The first head portion 131a may be disposed on the third surface 3 of the capacitor body 110, and may be in contact with the end portions of the first internal electrodes 121 externally exposed through the third surface 3 of the capacitor body 110 to serve to electrically connect the first internal electrodes 121 and the first external electrode 131 to each other.

The first band portion 131b may extend from the first head portion 131a to a portion of the first surface 1 of the capacitor body 110, and may serve to be electrically connected to a first external terminal 220 of the interposer 200.

Here, the first band portion 131b may further extend from the first head portion 131a to portions of the second, fifth, and sixth surfaces 2, 5, and 6 of the capacitor body 110 in order to improve adhesion strength, or the like.

The second external electrode 132 may include a second head portion 132a and a second band portion 132b.

The second head portion 132a may be disposed on the fourth surface 4 of the capacitor body 110, and may be in contact with the end portions of the second internal electrodes 122 externally exposed through the fourth surface 4 of the capacitor body 110 to serve to electrically connect the second internal electrodes 122 and the second external electrode 132 to each other.

The second band portion 132b may extend from the second head portion 132a to a portion of the first surface 1 of the capacitor body 110, and may serve to be electrically connected to a second external terminal 230 of the interposer 200.

Here, the second band portion 132b may further extend from the second head portion 132a to portions of the second, fifth, and sixth surfaces 2, 5, and 6 of the capacitor body 110 in order to improve adhesion strength, or the like.

Meanwhile, the first and second external electrodes 131 and 132 may further include plating layers.

The plating layers may include first and second nickel (Ni) plating layers and first and second tin (Sn) plating layers covering, respectively, the first and second nickel plating layers.

The interposer 200 according to the present exemplary embodiment may include the interposer body 210 and the first and second external terminals 220 and 230 formed on the opposite end portions of the interposer body 210 in the X direction (the first direction), respectively.

The interposer body 210 may include the woven glass fiber material 20 formed by weaving the glass fibers 21.

The woven glass fiber material 20 may serve to maintain sufficient mechanical strength of the interposer body 210.

The interposer body 210 may be formed by using the woven glass fiber material 20 as a core material and integrating an insulating resin with the core material.

The insulating resin may be a thermosetting resin such as an epoxy resin or a thermoplastic resin such as polyimide, but is not limited thereto.

Grooves may be formed in opposite surfaces of the interposer body 210 in the X direction, respectively.

Voltages having different polarities may be provided to the first and second external terminals 220 and 230, and the first and second external terminals 220 and 230 may be electrically and mechanically connected to the first and second band portions 131b and 132b of the first and second external electrodes 131 and 132, respectively.

The first external terminal 220 may include a first bonded portion 222, a first mounting portion 221, and a first connecting portion 223.

The first bonded portion 222, which is formed on an upper surface of the interposer body 210, may have one end exposed through one surface of the interposer body 210 in the X direction and be connected to the first band portion 131b of the first external electrode 131.

The first mounting portion 221, which is formed on a lower surface of the interposer body 210 to face the first bonded portion 222 in the Z direction, may serve as a terminal at the time of mounting the electronic component 101 on a board.

The first connecting portion 223 may be formed on the groove formed in one end surface of the interposer body 210 in the X direction, and may serve to connect an end portion of the first bonded portion 222 and an end portion of the first mounting portion 221 to each other.

In this case, a first conductive adhesive portion 321 may be disposed between the first bonded portion 222 and the first band portion 131b to bond the first bonded portion 222 and the first band portion 131b to each other.

The first conductive adhesive portion 321 may be formed of a high melting point solder, or the like.

The second external terminal 230 may include a second bonded portion 232, a second mounting portion 231, and a second connecting portion 233.

The second bonded portion 232, which is formed on the upper surface of the interposer body 210, may have one end exposed through the other surface of the interposer body 210 in the X direction and be connected to the second band portion 132b of the second external electrode 132.

The second mounting portion 231, which is formed on the lower surface of the interposer body 210 to face the second bonded portion 232 in the Z direction, may serve as a terminal at the time of mounting the electronic component 101 on the board.

The second connecting portion 233 may be formed on the groove formed in the other end surface of the interposer body 210 in the X direction, and may serve to connect an end portion of the second bonded portion 232 and an end portion of the second mounting portion 231 to each other.

In this case, a second conductive adhesive portion 322 may be disposed between the second bonded portion 232 and the second band portion 132b to bond the second bonded portion 232 and the second band portion 132b to each other.

The second conductive adhesive portion 322 may be formed of a high melting point solder, or the like.

In addition, plating layers may be formed on surfaces of the first and second external terminals 220 and 230, if necessary.

The plating layers may include nickel plating layers and tin plating layers covering the nickel plating layers.

When voltages having different polarities are applied to the first and second external electrodes 131 and 132 formed in the electronic component 101 in a state in which the electronic component 101 is mounted on the board through solders, the capacitor body 110 may be expanded and contracted in the Z direction due to an inverse piezoelectric effect of the dielectric layers 111.

Therefore, both end portions of the first and second external electrodes 131 and 132 may be contracted and expanded as opposed to the expansion and the contraction of the capacitor body 110 in the Z direction due to a Poisson effect, and such a contraction and expansion may generate vibrations.

In addition, the vibrations may be transferred to the board through the first and second external electrodes 131 and 132 and the first and second external terminals 220 and 230. Therefore, a sound may be radiated from the board to become an acoustic noise.

The interposer 200 according to the present exemplary embodiment may be attached to the first surface of the multilayer ceramic capacitor 100, which is a mounting direction of the multilayer ceramic capacitor 100, to serve to prevent the vibrations of the multilayer ceramic capacitor 100 from being transferred to the board, resulting in a reduction in the acoustic noise of the multilayer ceramic capacitor 100.

Experimental Example

In general, a size of a multilayer ceramic capacitor for which an interposer is used in order to reduce a vibration sound is 1005 (1.0 mm×0.5 mm) to 1608 (1.6 mm×0.8 mm).

However, in accordance with the trend toward performance improvement and miniaturization of an electronic device, the necessity for a multilayer ceramic capacitor having a small size has increased. Therefore, the necessity to effectively reduce a vibration sound even in a multilayer ceramic capacitor having a small size of 0804 (0.8 mm×0.4 mm) or less has increased.

An acoustic noise may be changed by a Young's modulus depending on an angle formed by a weaving direction (a $D_G$ direction) of the woven glass fiber material included in the interposer and a first direction (a $D_L$ direction) of the capacitor body and the interposer, and as a size of the multilayer ceramic capacitor becomes small, an influence of the angle may become great.

Therefore, as the size of the multilayer ceramic capacitor becomes small, the necessity to control the angle formed by the weaving direction (the $D_G$ direction) of the woven glass fiber material included in the interposer and the length direction (the first direction or the $D_L$ direction) of the capacitor body and the interposer may be increased.

The purpose of the present experiment may be to confirm a change in a vibration sound depending on a change in the angle formed by the weaving direction (the $D_G$ direction) of the woven glass fiber material included in the interposer and the first direction (the $D_L$ direction) of the capacitor body and the interposer.

The multilayer ceramic capacitor used in the present experiment has a length of 0.6 mm in the X direction, a width of 0.3 mm in the Y direction, and electrical characteristics of 2.2 μF.

In addition, the interposer has a length of 0.6 mm in the X direction, a width of 0.34 mm in the Y direction, and a thickness of 0.06 mm in the Z direction.

The interposer was manufactured so that the angle formed by the first direction (the $D_L$ direction), which is the length direction of the interposer, and the weaving direction (the $D_G$ direction) of the woven glass fiber material included in the interposer has a range of 0° to 90°.

Samples of electronic components were manufactured by bonding a multilayer ceramic capacitor to an upper surface of the manufactured interposer so that the length direction of the interposer and a length direction of the multilayer ceramic capacitor coincide with each other, using solders, acoustic noises were measured in each of the samples, and measurement results were represented in Table 1. Samples in which an acoustic noise is 25 dB or more were determined to be Comparative Examples.

Figure 6:
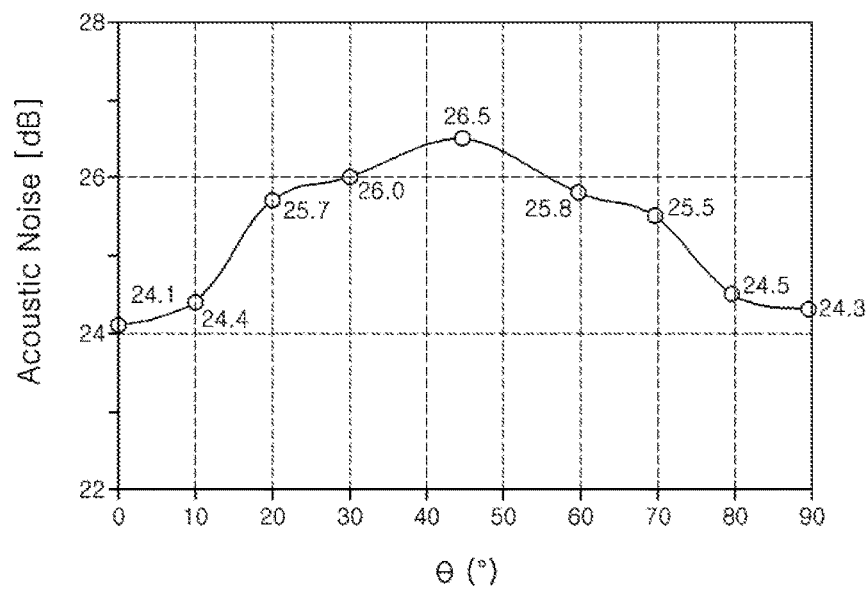
FIG. 6 is a graph illustrating an acoustic noise depending on an angle formed by a weaving direction of the woven glass fiber material and a first direction.

In addition, a change in an acoustic noise (dB) depending on θ(°) is illustrated as a graph in FIG. 6.

TABLE 1

| Sample No. | θ (°) | Acoustic noise (dB) |
|---|---|---|
| 1 | 0 | 24.1 |
| 2 | 10 | 24.4 |
| 3* | 20 | 25.7 |
| 4* | 30 | 26.0 |
| 5* | 45 | 26.5 |
| 6* | 60 | 25.8 |
| 7* | 70 | 25.5 |
| 8 | 80 | 24.5 |
| 9 | 90 | 24.3 |

*Comparative Example

Referring to Table 1 and FIG. 6, it may be confirmed that in Samples Nos. 3 to 7 in which θ is not 0° to 10° or 80° to 90°, acoustic noises are high (25.5 dB or more).

On the other hand, it may be confirmed in Samples Nos. 1, 2, 8 and 9 in which θ is 0° to 10° or 80° to 90°, acoustic noises are low (24.5 dB or less).

In addition, referring to FIG. 6, it may be confirmed that when θ exceeds 0°, an acoustic noise is rapidly increased, when θ is less than 80°, an acoustic noise is rapidly increased.

Therefore, the angle formed by the weaving direction of the woven glass fiber material and the first direction that may expect an acoustic noise reducing effect may be 0° to 10° or 80° to 90°.

As set forth above, according to an exemplary embodiment in the present disclosure, an acoustic noise reducing effect of a predetermined level or more may be expected even in a multilayer ceramic capacitor having a small size.

While exemplary embodiments have been shown and described above, it will be apparent to those skilled in the art that modifications and variations could be made without departing from the scope of the present invention as defined by the appended claims.

What is claimed is:

1. An electronic component comprising:
   a multilayer ceramic capacitor including a capacitor body and external electrodes disposed on opposite ends of the capacitor body in a first direction, respectively; and
   an interposer including an interposer body including a woven glass fiber material and external terminals disposed on opposite ends of the interposer body in the first direction, respectively, wherein an angle between a weaving direction of the woven glass fiber material and the first direction is 0° to 10° or 80° to 90°.

2. The electronic component of claim 1, wherein the interposer body has grooves formed in opposite end surfaces thereof in the first direction, respectively, and each of the external terminals includes a bonded portion formed on an upper surface of the interposer body and connected to a respective one of the external electrodes, a mounting portion formed on a lower surface of the interposer body, and a connecting portion formed on the groove of the interposer body to connect the bonded portion and the mounting portion to each other.

3. The electronic component of claim 1, wherein the multilayer ceramic capacitor has a length of 0.8 mm or less and a width of 0.4 mm or less.

4. The electronic component of claim 1, wherein the multilayer ceramic capacitor has a thickness of 0.7 mm or less.

5. The electronic component of claim 1, further comprising conductive adhesive portions respectively disposed between the external electrodes and the external terminals.

6. The electronic component of claim 1, further comprising plating layers disposed on surfaces of the external electrodes and the external terminals, respectively.

7. The electronic component of claim 1, wherein the capacitor body has first and second surfaces opposing each other, third and fourth surfaces connected to the first and second surfaces and opposing each other in the first direction, and fifth and sixth surfaces connected to the first and second surfaces, connected to the third and fourth surfaces, and opposing each other, and includes a plurality of dielectric layers and first and second internal electrodes alternately arranged having the dielectric layers interposed therebetween, the external electrodes include first and second external electrodes disposed on the third and fourth surfaces of the body, respectively, and the first internal electrodes are exposed through the third surface to be connected to the first external electrode and the second internal electrodes are exposed through the fourth surface to be connected to the second external electrode.

8. The electronic component of claim 7, wherein L is 0.8 mm or less, W is 0.4 mm or less, and T is 0.7 mm or less, in which T is a distance between the first surface and the second surface of the capacitor body, L is a distance between the third surface and the fourth surface of the capacitor body, and W is a distance between the fifth surface and the sixth surface of the capacitor body.

9. The electronic component of claim 7, wherein the first and second internal electrodes are alternately arranged in a direction in which the first and second surfaces are connected to each other with each of the dielectric layers interposed therebetween.

* * * * *